July 14, 1970 ATUTOSI OKAMOTO ET AL 3,520,576
ANTI-SKID APPARATUS FOR AUTOMOTIVE VEHICLES
Original Filed Nov. 22, 1967 2 Sheets-Sheet 1

United States Patent Office 3,520,576
Patented July 14, 1970

3,520,576
ANTI-SKID APPARATUS FOR AUTOMOTIVE VEHICLES
Atutosi Okamoto, Toyohashi-shi, Koichi Taniguchi, Kariya-shi, and Yoshiaki Nakano, Gifu-shi, Japan, assignors to Nippon Denso Company Limited, Kariya-shi, Japan, a corporation of Japan
Original application Nov. 22, 1967, Ser. No. 685,118, now Patent No. 3,467,443. Divided and this application Mar. 6, 1969, Ser. No. 817,603
Claims priority, application Japan, Aug. 17, 1967, 42/53,041; Aug. 21, 1967, 42/53,626; Aug. 31, 1967, 42/56,006
Int. Cl. B60t 8/02, 15/02, 8/12
U.S. Cl. 303—21          1 Claim

ABSTRACT OF THE DISCLOSURE

An anti-skid apparatus for an automotive vehicle having a device for detecting the speed of the vehicle body. The apparatus acts to prevent a loss of steerability or a gyrating movement of the vehicle body due to the locked state of the wheel resulting from the impartation of a brake force to the vehicle when the vehicle is running on a slippery road surface or running at high speed.

This is a division of application Ser. No. 685,118, filed Nov. 22, 1967, now U.S. Pat No. 3,467,443.

BACKGROUND OF THE INVENTION

Field of the invention

This invention relates to an anti-skid apparatus for an automotive vehicle, which is especially useful to prevent a gyrating movement of the vehicle body or a loss of the steerability of the vehicle due to the locked state of the wheels resulting from the impartation of a brake force to the automotive vehicle which is running on a slippery road surface or running at a high speed.

Description of the prior art

Anti-skid apparatus heretofore known in the art were so designed as to detect the deceleration or acceleration of the wheels of an automotive vehicle to thereby impart a brake force to the automotive vehicle or release a brake force having been imparted to the vehicle. However, as is commonly known, the deceleration of the vehicle body becomes maximum when the slip ratio $\sigma$, which is determined by the speed SB of the vehicle body and the speed SH of the wheel at the time of brake force impartation and is given by the equation, $$\sigma = \frac{SB - SH}{SB} \times 100$$

lies within a range between 15% and 20%.

The prior art anti-skid apparatus described above which was designed to control the hydraulic pressure in the brake system independently of the slip ratio $\alpha$ unavoidably involved such a defect that a long braking distance was required to stop the vehicle, or the wheels were liable to be locked when the brake was imparted to the vehicle running on a slippery road surface such as a frozen road surface. In order to eliminate the above defect, an anti-skid apparatus which can exactly control the hydraulic pressure in the brake system depending on the slip ratio $\sigma$ must be developed. In this respect, for the successful development of such an anti-skid apparatus, a vehicle body speed detecting device for successfully detecting the slip ratio $\sigma$ is inevitably required. Since, however, an anti-skid apparatus is functionally requested to exactly detect the speed of the vehicle body in the braked state of a vehicle, an attempt to merely connect an electric generator to the wheel of the vehicle to thereby detect the speed of the vehicle body on the basis of a voltage generated by the electric generator has been attended with the unacceptable result that the speed of the vehicle body so detected is utterly unsatisfactory because of the fact that a slip takes place on the wheels in such a braked state of the vehicle. The above defect may be remedied by affixing to the vehicle body an extra wheel which is independent of the brake system and does not therefore contribute to the drive of the vehicle, and by connecting an electric generator to this wheel for thereby exactly detecting the speed of the vehicle body in the braked state. The provision of such an extra wheel, however, is defective and unpractical in view of the fact that the structure of the vehicle body must be varied and the device as a whole becomes quite expensive.

Further, the prior art anti-skid apparatus in which the hydraulic pressure was controlled independently of the slip ratio $\sigma$ was not so designed as to detect the speed of the vehicle body per se. Therefore, the prior art anti-skid apparatus has been defective in that the hydraulic pressure in the brake system tends to be reduced to such an extent that the speed of the vehicle body equals the speed of the wheel with the result that the deceleration of the vehicle body is momentarily reduced to zero, and at the next moment, the hydraulic pressure in the brake system is increased to such an extent that a large deceleration in the order of 1$g$ ($g$ being the acceleration of gravity) is imparted to the vehicle body, the above situation being repeated to give a very uncomfortable feeling of ride during the impartation of the brake force to the vehicle.

Moreover, the prior art anti-skid apparatus was operative to detect the deceleration and acceleration of the wheels to thereby merely effect the on-off control of the brake force. For example, the prior art anti-skid apparatus was so designed that, when the wheels were braked to run with a deceleration less than a predetermined setting due to the impartation of a brake force to the vehicle, the apparatus was actuated to relieve the brake force to thereby allow the wheels to run at an increased speed, and when the acceleration exceeded a predetermined setting, the apparatus was operative to impart a brake force to the vehicle again. However, the prior art apparatus of the kind which was adapted to merely effect the on-off control of the brake force in two stages, that is, a stage of a high brake force and a stage of a low brake force, has given rise to an objectionable problem that the brake force is relieved more than is required on a hardly slippery road surface, and as a result, excessive and quickly repeated fluctuation takes place in the rotation of the wheels so that the speed of response of the anti-skid action is so low as to properly follow up the variation in the speed of the wheels. In view of the above situation, an attempt to provide a brake force control means which can properly follow up the rate of variation in the speed of the wheels has resulted in the requirement for the provision of a power source which can deliver a power as high as several horsepowers. Thus, the attainment of such a high speed response as described above has been utterly impracticable with a brake force control means of the vacuum type utilizing the negative pressure of the engine or with a brake force control means of the electrically driven type employing an electric motor which is adapted to receive its drive power from the battery mounted on the vehicle.

The brake force control means of the vacuum type or of the electrically driven type, when adapted to operate by detecting the deceleration or acceleration of the wheels, has also been defective in that the speed of response of the anti-skid action is so low as to properly follow up the rate of variation in the speed of the wheels when the vehicle is running on a hardly slippery road surface, and the deceleration of the vehicle body during the braking operation varies usually very much between 0 to 1g (g being the acceleration of gravity) at a period in the order of 2 cycles per second, with the result that a long braking distance is required to stop the vehicle and a very uncomfortable feeling of ride is unavoidable during the impartation of the brake force to the vehicle. Moreover, when the vehicle runs on a slippery road surface such as a frozen road surface, there has frequently been a danger such that the vehicle skids over the frozen road surface with its wheels kept in their locked state because the wheels may prematurely be urged to their locked state depending on the degree of actuation of the brake pedal without the speed of the wheels being reduced to a value less than a predetermined setting, and the brake force thus imparted is not released at all once the wheels have been locked in the above manner.

SUMMARY OF THE INVENTION

With a view to eliminate the prior defects described above, it is the primary object of the present invention to provide a novel anti-skid apparatus for an automotive vehicle which can satisfactorily attain the desired anti-skid operation on a slippery road surface in spite of the fact that it is simple in structure and can be manufactured at a low cost.

Another object of the present invention is to provide a highly practical and inexpensive anti-skid apparatus for an automotive vehicle which can exactly detect the speed of the vehicle body in the braked state of the vehicle.

Another object of the present invention is to provide an anti-skid apparatus for an automotive vehicle which is operative to positively prevent the wheels from being continuously locked when the vehicle runs on a slippery road surface and to maintain a substantially constant deceleration of the vehicle body when a brake force is imparted to the vehicle running on a hardly slippery road surface, for thereby shortening the braking distance to stop the vehicle and giving a comfortable feeling of ride during the impartation of the brake force to the vehicle. In order to attain the above object, the present invention contemplates the provision of an anti-skid apparatus which comprises means for controlling the brake force in three different stages, that is, a high brake force stage, a medium brake force stage and a low brake force stage, means for deriving a voltage $V_G$ representing the speed of the wheel, means for deriving a voltage $V_C$ representing such a speed of the vehicle body which is $\beta$ times a voltage $V_B$ representing the actual speed of the vehicle body, where $0<\beta<1$, and means for sensing a deceleration of the vehicle body, said brake force control means being operative in such a way that a transition from the high brake force stage to the medium brake force stage takes place when the deceleration of the vehicle body exceeds a predetermined setting and the voltage $V_G$ is lower than the voltage $V_C$, and a transition from the medium brake force stage to the high brake force stage takes place when the deceleration of the vehicle body exceeds the predetermined setting and the voltage $V_G$ is higher than the voltage $V_C$, while a transition from the high brake force stage to the low brake force stage takes place when the deceleration of the vehicle body is less than the predetermined setting value and the voltage $V_G$ is lower than the voltage $V_C$, and a transition from the low brake force stage to the high brake force stage takes place when the deceleration of the vehicle body is less than the predetermined setting value and the voltage $V_G$ is higher than the voltage $V_C$.

BRIEF DESCRIPTION OF THE DRAWINGS

In the drawings:

FIGS. 3a, 3b and 3c are graphic representations for the explanation of the anti-skid operation by the anti-skid apparatus according to the present invention, wherein FIG. 3A shows the relation between the speed responsive voltage and braking time, FIG. 3B shows the relation between the hydraulic pressure in the wheel cylinder and the braking time, and FIG. 3C shows the relation between the deceleration of the vehicle body and the braking time.

DESCRIPTION OF THE PREFERRED EMBODIMENTS

Figure 1:
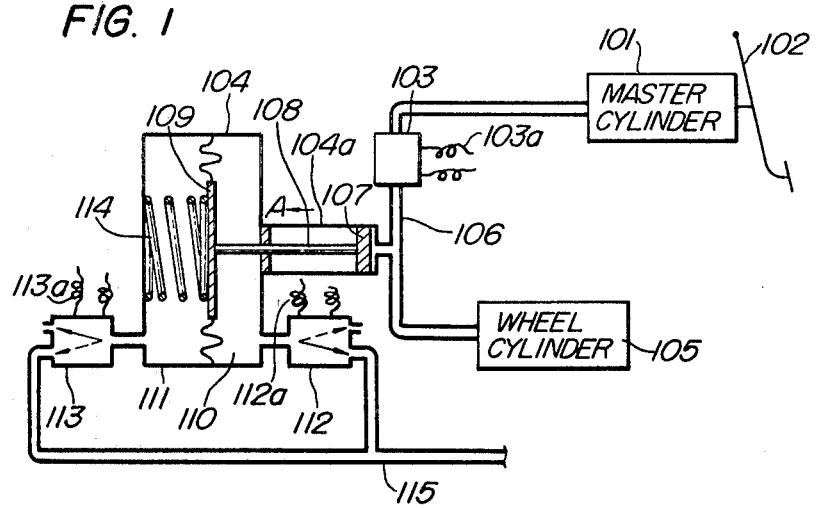
FIG. 1 is a diagrammatic view showing the structure of another embodiment of the anti-skid apparatus according to the present invention equipped with a brake force control device.
Figure 2:
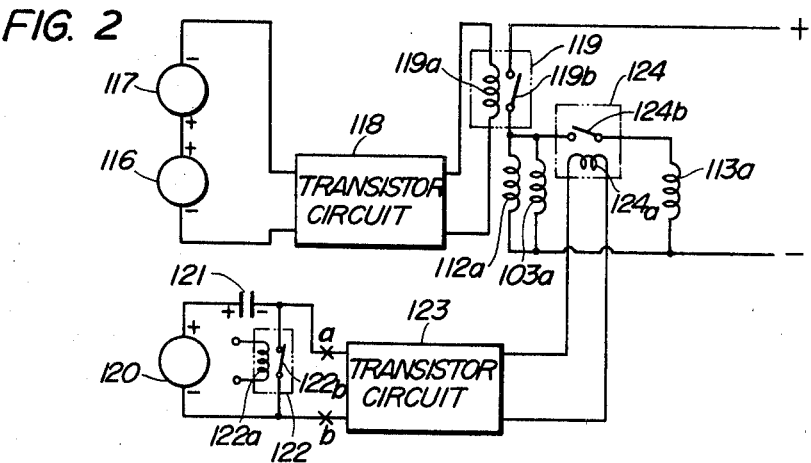
FIG. 2 is an electrical connection diagram of an electrical control section in the brake force control device shown in FIG. 1.

Referring to FIGS. 1 and 2, a master cylinder 101 in the brake system in an automotive vehicle is connected with a brake pedal 102 so as to control the hydraulic pressure in the brake system. The anti-skid apparatus comprises a solenoid-operated shut-off valve 103 which is disposed in a hydraulic fluid conduit 106 connecting the master cylinder 101 with a brake force controller 104 and a wheel cylinder 105 and acts to shut off the hydraulic fluid supply to the brake force controller 104 and the wheel cylinder 105 when the brake force is relieved during the anti-skid operation. The brake force controller 104 is equipped with a hydraulic cylinder 104a in which a piston 107 is slidably received so as to cause a variation in the hydraulic pressure in the wheel cylinder 105. A connecting rod 108 mechanically connects the piston 107 with a diaphragm 109 disposed in the brake force controller 104 and acts to transmit a force exerted on the diaphragm 109 to the piston 107. The diaphragm 109 divides the interior of the brake force controller 104 into two air chambers 110 and 111 with which respective solenoid-operated change-over valves 112 and 113 are connected so that a negative pressure developed by the inhalation of air into the engine and the atmospheric pressure can be selectively introduced into these air chambers 110 and 111. A coil spring 114 is disposed in the air chamber 111 for normally urging the diaphragm 109 toward the air chamber 110. For example, the coil spring 114 is so designed as to urge the diaphragm 109 to thereby normally set the hydraulic pressure in the wheel cylinder 105 at 20 kilograms per square centimeter. The solenoid-operated change-over valve 112 is operative in such a way as to establish the communication between the air chamber 110 and a negative pressure detecting section for the engine (not shown) in the deenergized state of a solenoid 112a while interrupting the communication between the air chamber 110 and the atmosphere, and to interrupt the communication between the air chamber 110 and the negative pressure detecting section for the engine in the energized state of the solenoid 112a while establishing the communication between the air chamber 110 and the atmosphere. On the other hand, the solenoid-operated change-over valve 113 is operative in such a manner as to interrupt the communication between the air chamber 111 and the negative pressure detecting section for the engine in the deenergized state of a solenoid 113a while establishing the communication between the air chamber 111 and the atmosphere, and to establish the communication between the air chamber 111 and the negative pressure detecting section for the engine in the energized state of the solenoid 113a while interrupting the communication between the air chamber 111 and the atmosphere. A negative pressure supply conduit 115 is provided to connect the engine negative pressure detecting section with the air chambers 110 and 111.

In FIG. 2, there is shown an electrical circuit of the electrical control section for the brake force controller 104 shown in FIG. 1. In the circuit, there is a vehicle body speed detector 116 which is so designed as to detect a voltage $V_C$ representing such a speed of the vehicle body which is $\beta$ times (where $0<\beta<1$) a voltage $V_B$ representing the actual speed of the vehicle body. Such a voltage $V_C$ may, for example, be obtainel by dividing the output of a vehicle body speed detecting device. There is also provided a wheel speed detector 117 which may be an electric generator connected to one of the wheels of the vehicle. It will be apparent that the voltage $V_C$ representing the speed of the vehicle body detected by the vehicle body speed detector 116 during the normal running state of the vehicle is $\beta$ times a voltage $V_G$ representing the speed of the wheel detected by the wheel speed detector 117. The wheel speed detector 117 is connected in series with the vehicle body speed detector 116 in such a manner that their output voltages have polarities opposite to each other. A transistor circuit 118, which may, for example, be a Schmitt circuit is connected to the detectors 116 and 117 in order to discriminate the positive value or the negative value of the difference between the voltage $V_C$ representing the speed of the vehicle body and the voltage $V_G$ representing the speed of the wheel. The transistor circuit 118 energizes a relay coil 119a of a relay 119 when the voltage $V_G$ representing the speed of the wheel becomes lower than the voltage $V_C$ representing the speed of the vehicle body, and deenergizes the relay coil 119a of the relay 119 when the voltage $V_G$ becomes higher than the voltage $V_B$. A solenoid 103a of the solenoid-operated shut-off valve 103 and the solenoid 112a of the solenoid-operated change-over valve 112 are connected in series with relay contacts 119b of the relay 119. In the circuit, there is a vehicle body deceleration detector 120 which may, for example, be a differential transformer of the structure having a ferrite rod whose position is variable depending on the movement of an associated weight. A condenser 121 and a relay 122 having a relay coil 122a and normally closed relay contacts 122b are connected with the vehicle body deceleration detector 120. The relay 122 is arranged for operation in an interlocked relation with the brake pedal 102 so that the actuation of the brake pedal 102 energizes the relay coil 122a to thereby urge the relay contacts 122d to open. A transister circuit 123 associated with the detector 120 has a high input impedance so as to prevent the charge stored in the condenser 121 from discharging at the time of the impartation of the brake force to the vehicle, and is operative to urge relay contacts 124b of a relay 124 to open by deenergizing a relay coil 124a when the deceleration of the wheel developed during the braking operation exceeds a definite value, say, 0.4g (g being the acceleration of gravity). The solenoid 113a of the solenoid-operated change-over valve 113 is connected in series with the relay contacts 124b of the relay 124.

The anti-skid apparatus having a structure as described above operates in the manner described below. When the brake pedal 102 is actuated to impart a brake force to the running vehicle, the relay contacts 122b of the relay 122 are urged to open so that the condenser 121 is now connected in series with the vehicle body deceleration detector 120 from the previous parallel connection therewith. Accordingly, at such a moment, the output voltage of the electrical circuit consisting of the vehicle body deceleration detector 120 and the condenser 121, that is, the voltage appearing across the input terminals $a$ and $b$ of the transistor circuit 123 becomes necessarily zero, and thereafter a voltage representing the deceleration of the vehicle body is supplied from the vehicle body deceleration detector 120 to appear across the input terminals $a$ and $b$ of the transistor circuit 123. On the other hand, the output of the transistor circuit 118 holds the relay contacts 119b of the relay 119 in the open state and thus the respective solenoids 112a and 113a of the solenoid-operated change-over valves 112 and 113 associated with the brake force controller 104 are in their deenergized state. Under such a state, the negative pressure appears in the air chamber 110 and the atmospheric pressure appears in the air chamber 111, with the result that the piston 107 is urged to the right-hand extremity of the cylinder 104a by the daphragm 109 as shown in FIG. 1. When the hydraulic pressure in the wheel cylinder 105 increases to reduce the voltage $V_G$ representing the speed of the wheel to such an extent that the voltage $V_G$ becomes lower than the voltage $V_C$ representing the speed of the vehicle body which is $\beta$ times the voltage $V_B$ representing the actual speed of the vehicle body, the transistor circuit 118 energizes the relay coil 119a to thereby close the relay contacts 119b of the relay 119. By the closure of the relay contacts 119b, the respective solenoids 103a and 112a of the solenoid-operated shutoff valve 103 and the solenoid-operated changeover valve 112 are energized, with the result that the solenoid-operated shut-off valve 103 shuts off the hydraulic fluid supply through the hydraulic fluid supply conduit 106 extending from the master cylinder 101 to the brake force controller 104 and the wheel cylinder 105, and at the same time, the solenoid-operated change-over valve 112 interrupts the communication between the air chamber 110 and the engine negative pressure detecting section and now establishes the communication between the air chamber 110 and the atmosphere.

In the meantime, the solenoid 113a of the solenoid-operated change-over valve 113 is controlled by the transistor circuit 123 and the relay 124 in such a way that it is deenergized when the deceleration of the vehicle body produced by the impartation of the brake action exceeds a predetermined setting of, say, 0.4g and is energized when the deceleration is less than 0.4g. Accordingly, suppose now that the deceleration of the vehicle body at a time when the voltage $V_G$ representing the speed of the wheel has been reduced to a value less than the voltage $V_B$ representing the speed of the vehicle body is more than 0.4g, then the solenoid 113a of the solenoid-operated change-over valve 113 remains in its deenergized state. Due to the deenergized state of the solenoid 113a, the atmospheric pressure appears in both the air chambers 110 and 111, and the hydraulic pressure in the wheel cylinder 105 is reduced to a predetermined value of, say 20 kilograms per square centimeter which is primarily determined by the force of the coil spring 114. In this connection, the strength of the coil spring 114 is so set that, within a range of the vehicle body deceleration from 1g to 0.4g, a hydraulic pressure of such an extent as will not lock the wheel can be supplied to the wheel cylinder 105. Because of such a setting in the strength of the spring 114, the brake force is relieved and the speed of the wheel starts to increase again. However, the rate of increase in the speed of the wheel is gradual in this case since the predetermined brake force is still imparted to the wheel by the spring 114. Then when the voltage $V_G$ representing the speed of the wheel becomes higher than the voltage $V_C$ representing the speed of the vehicle body, the relay coil 119a of the relay 119 is deenergized by the transistor circuit 118 so that the opening of the relay contacts 119b urges both the solenoid-operated change-over valves 112 and 113 to their deenergized state. As a result, the negative pressure appears in the air chamber 110 and the atmospheric pressure appears in the air chamber 111, so that the hydraulic pressure in the wheel cylinder 105 increases again to reduce the voltage $V_G$ representing the speed of the wheel again. Thereafter the above operation is repeated until finally the vehicle body is stopped.

Next, consider a case in which the vehicle runs on a slippery road surface and the deceleration of the vehicle body is less than 0.4g. When, in such a case, the voltage $V_G$ representing the speed of the wheel becomes lower than the voltage $V_C$ representing the speed of the vehicle body, the relay coil 119a of the relay 119 is energized by the transistor circuit 118 to close the relay contacts 119b, with the result that the respective solenoids 103a, 112a and 113a of the solenoids-operated shut-off valve 103 and the solenoid-operated change-over valves 112 and 113 are all urged to their energized state. Therefore, the hydraulic fluid supply through the hydraulic fluid supply conduit 106 extending from the master cylinder 101 to the brake force controller 104 and the wheel cylinder 105 is shut off, and at the same time, the atmospheric pressure appears in the air chamber 110 and the negative pressure appears in the air chamber 111, which results in a movement of the diaphragm 109 in a direction as shown by the arrow A to compress the coil spring 114. The above movement of the diaphragm 109 causes a corresponding movement of the piston 107 in the direction of the arrow A until the piston 107 proceeds to the left-hand extremity of the cylinder 104a for thereby reducing the hydraulic pressure in the wheel cylinder 105 to zero. As the hydraulic pressure in the wheel cylinder 105 is reduced in this manner, the speed of the wheel increases gradually to an extend that the voltage $V_G$ representing the speed of the wheel exceeds the voltage $V_C$ representing the speed of the vehicle body again. Since, in such a situation, the transistor circuit 118 deenergizes the relay coil 119a of the relay 119 to thereby open the relay contacts 119b, the respective solenoids 103a, 112a and 113a of the solenoid-operated shut-off valve 103 and the solenoid-operated change-over valves 112 and 113 are all urged to their deenergized state, with the result that the shut-off valve 103 opens to allow the flow of the hydraulic fluid through the hydraulic fluid supply conduit 106, and at the same time, the negative pressure appears in the air chamber 110 and the atmospheric pressure appears in the air chamber 111 for thereby allowing an increase in the hydraulic pressure in the wheel cylinder 105. When the increase in the hydraulic pressure in the wheel cylinder 105 reduces the speed of the wheel to such an extent that the voltage $V_G$ representing the speed of the wheel becomes lower than the voltage $V_C$ representing the speed of the vehicle body, the shut-off valve 103 shuts off the hydraulic fluid supply through the hydraulic fluid supply conduit 106, and at the same time, the atmospheric pressure appears in the air chamber 110 and the negative pressure appears in the air chamber 111 so that the hydraulic pressure in the wheel cylinder 105 is reduced to zero again. Thereafter, the above operation is repeated to control the drive of the vehicle running on the slippery road surface.

Figure 3A:
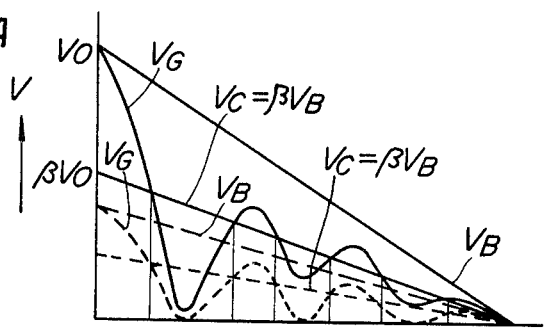
Figure 3B:
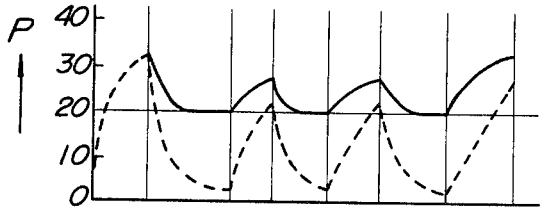
Figure 3C:
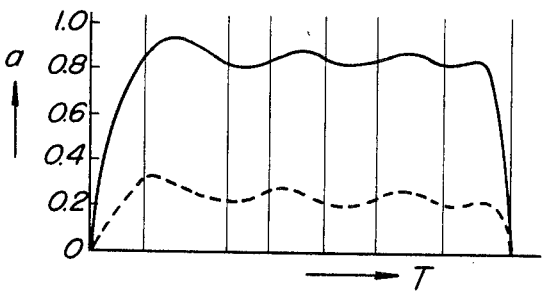

FIG. 3 shows graphically the anti-skid operation when a vehicle is controlled by the anti-skid apparatus according to the present invention. The ordinate in each of FIGS. 3A, 3B and 3C represents the braking time T, while the abscissas in FIGS. 3A, 3B and 3C represent the speed responsive voltage V, the hydraulic pressure P in the wheel cylinder 105, and the vehicle body deceleration a, respectively. A line S in FIG. 3B represents a predetermined hydraulic pressure which is determined by the force of the coil spring 114. In FIG. 3, the solid curves indicate the anti-skid operation on a hardly slippery road surface, while the broken curves indicate the anti-skid operation on a slippery road surface. It will be seen from FIG. 3 that, on a hardly slippery road surface, an appreciably large variation does not take place in the vehicle body deceleration a and the brakage is effected with a substantially constant deceleration because the hydraulic pressure P is always imparted to the wheel cylinder 105 in spite of the fact that the wheels are sufficiently rotating during the braking operation. Thus, the vehicle equipped with the anti-skid apparatus provides a comfortable feeling of ride and can be stopped with a shortened braking distance compared with vehicles equipped with prior art anti-skid apparatus. Further, on a slippery road surface, it will be seen that the hydraulic pressure P imparted to the wheel cylinder 105 is necessarily relieved irrespective of whatever value of the vehicle body deceleration a when the voltage $V_G$ representing the speed of the wheel becomes lower than the voltage $V_C$ representing the speed of the vehicle body, and thus any tendency of the wheel to be kept in a locked state can be positively obviated. It should also be understood that, on a slippery road surface, the sense of ride will not become an appreciable problem in view of the fact that the vehicle body deceleration a is so small on such a road surface.

In the foregoing, description has been given with particular reference to the anti-skid operation when the apparatus of the present invention is adapted to cooperate with a hydraulic brake system, but it will be readily understood that the invention is equally effectively applicable to brake systems employing compressed air or vacuum for the brake operation.

It will be appreciated from the foregoing description that the anti-skid apparatus for an automotive vehicle according to the present invention exhibits such a marked effect that, on a hardly slippery road surface accompanied by a large deceleration of the vehicle body, the brake force is not rendered zero but a predetermined brake force of such an extent as will not lock the wheel is left even in the relieved state of the brake force in order to minimize the variation in the vehicle body deceleration. Such a marked effect can be obtained by virtue of the fact that the anti-skid apparatus comprises brake force control means which controls the brake force in three stages, that is, a high brake force stage, a medium brake force stage and a low brake force stage, and which is operable in such a manner that a transition from the high brake force stage to the medium brake force stage takes place when the deceleration of the vehicle body exceeds a predetermined setting and a voltage $V_G$ representing the speed of the wheel is higher than a voltage $V_C$ representing such a speed of the vehicle body which is $\beta$ times a voltage $V_B$ representing the actual speed of the vehicle body, while a transition from the medium brake force stage to the high brake force stage takes place when the vehicle body deceleration exceeds the above setting and the voltage $V_G$ is lower than the voltage $V_C$. It is therefore possible to shorten the braking distance to stop the vehicle and to give a comfortable feeling of ride during the braking operation. The manner of operation on a hardly slippery road surface in which the brake force is not rendered zero but a predetermined brake force of such an extent as will not lock the wheel is left even in the relieved state of the brake force is effective to retard the rate of variation in the rotation of the wheel during the anti-skid operation. Therefore, another notable effect derivable from the invention is that the brake force control means need not have an excessively high speed of response and can be sufficiently actuated by a power source of a small capacity such as the negative pressure of the engine or the battery mounted on the vehicle to satisfactorily control the anti-skid operation. Further, in the invention, a transition from the high brake force stage to the low brake force stage takes place when the vehicle body deceleration is less than the predetermined setting and the voltage $V_G$ representing the speed of the wheel is higher than the voltage $V_C$ representing the speed of the vehicle body, and a transition from the low brake force stage to the high brake force stage takes place when the vehicle body deceleration is less than the predetermined setting and the voltage $V_G$ is lower than the voltage $V_C$. Accordingly, on a road surface such as a frozen road surface where a small vehicle body deceleration can only be developed, the brake force is substantially reduced to zero and is positively relieved when the voltage $V_G$ representing the speed of the wheel becomes lower than the voltage $V_C$ representing the speed of the vehicle body. The present invention therefore provides another excellent effect that the wheels are not continuously kept in a locked state and the anti-skid operation can be satisfactorily carried out even on a frozen road surface.

We claim:
1. An anti-skid apparatus for an automotive vehicle having a device for detecting the speed of the vehicle body and a device for detecting the slip ratio of the wheel, said apparatus comprising means for controlling the brake force in three different stages, that is, a high brake force stage, a medium brake force stage and a low brake force stage, means for deriving a voltage representing the speed of the wheel, means for deriving a voltage representing such a speed of the vehicle body which is $\beta$ times the actual speed of the vehicle body, and means for sensing a deceleration of the vehicle body, said brake force control means being operative in such a way that a transition from the high brake force stage to the medium brake force stage takes place when the deceleration of the vehicle body exceeds a predetermined setting and the voltage derived by said first-mentioned voltage deriving means is lower than the voltage derived by said second-mentioned voltage deriving means, and a transition from the medium brake force stage to the high brake force stage takes place when the deceleration of the vehicle body exceeds the predetermined setting and the voltage derived by said first-mentioned voltage deriving means is higher than the voltage derived by said second-mentioned voltage deriving means, while a transition from the high brake force stage to the low brake force stage takes place when the deceleration of the vehicle body is less than the predetermined setting and the voltage derived by said first-mentioned voltage deriving means is lower than the voltage derived by said second-mentioned voltage deriving means, and a transition from the low brake force stage to the high brake force stage takes place when the deceleration of the vehicle body is less than the predetermined setting and the voltage derived by said first-mentioned voltage deriving means is higher than the voltage derived by said second-mentioned voltage deriving means.

References Cited

UNITED STATES PATENTS

| | | | |
|---|---|---|---|
| 3,169,595 | 2/1965 | Shepherd | 303—21 X |
| 3,235,036 | 2/1966 | Meyer et al. | 188—181 |
| 3,362,757 | 1/1968 | Marcheron | 303—21 |

MILTON BUCHLER, Primary Examiner

J. J. McLAUGHLIN, Jr., Assistant Examiner

U.S. Cl. X.R.
188—181; 303—61